(Model.)

A. KAYSER.
Pocket Knife.

No. 243,071.  Patented June 21, 1881.

Witnesses
Geo. H. Strong.
Frank A. Brooks

Inventor
Albert Kayser
By Dewey & Co,
Attys

Answer limit hit — drafting minimal.

UNITED STATES PATENT OFFICE.

ALBERT KAYSER, OF SAN FRANCISCO, CALIFORNIA.

POCKET-KNIFE.

SPECIFICATION forming part of Letters Patent No. 243,071, dated June 21, 1881.

Application filed April 4, 1881. (Model.)

*To all whom it may concern:*

Be it known that I, ALBERT KAYSER, of the city and county of San Francisco, State of California, have invented an Improved Pocket-Knife; and I hereby declare the following to be a full, clear, and exact description thereof.

My invention relates to the class of pocket-knives the novelty in which is in the peculiar construction of the handle and arrangement of the blades, whereby the said blades may be easily removable, and contained complete within the handle when not in use, and pushed out therefrom when required, being held in place to prevent their unexpectedly closing up and hurting the hand.

The object of the invention is to provide a knife the blades of which can be easily removed and others inserted, and which, when not in use, will be convenient and harmless, the blades not being able to open in the pocket, and when in use will be held firm and rigid, the whole knife being substantial and not likely to get out of order.

Figure 1:
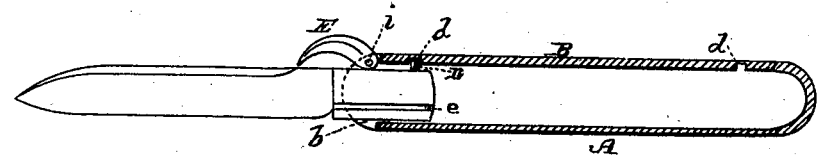
Figure 2:
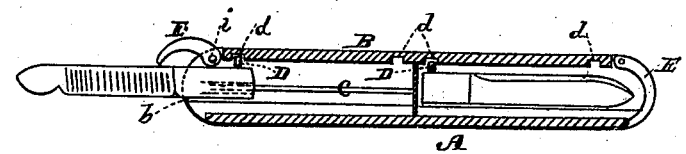
Figure 3:
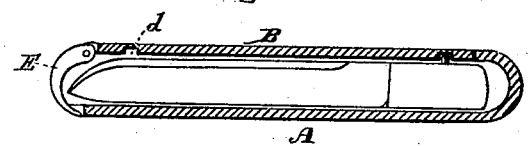
Figure 4:
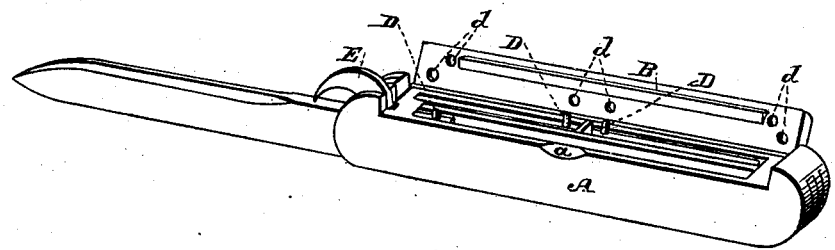
Figure 5:
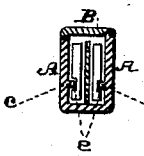

Referring to the accompanying drawings, Figures 1, 2, and 3 are sectional views of my invention. Fig. 4 is a perspective view of the same with the lid opened out. Fig. 5 is a transverse section.

Let A represent the handle, consisting of a hollow case, open on top and provided with a cover or lid, B, hinged the length of one side, and fitting down upon the top, which is cut out to receive it and allow it, when closed, to lie flush with the ends. A nail notch or socket, $a$, is provided to allow the lid to be readily opened. The ends of the case A are provided with openings $b$, of sufficient size to permit the blades C to project through them. These blades are contained within the case, which is fitted with partitions, forming appropriate spaces for their reception, as in any ordinary knife. In the lower part of these spaces, on the sides of the case A, are the flanges or ribs $c$, as shown, over which grooves $e$ in the heads of the blades fit and slide, thus keeping the edges of the blades from coming in contact with the bottom of the case, and preventing them from falling out when the knife is inverted.

The base or head of the blades on the upper side has the lugs, or pins, or screws D, to allow the nail to get hold of and push the blades out. These screws extend above the top of the case A, and corresponding sockets, $d$, are made in the cover B, to receive them and allow the cover to fit down tight. The sockets $d$ in the cover are so placed as to be in position for the pins D, whether the blades be fully shut within the case or fully extended. The blades are thus retained in the case or in position when opened, and cannot slip out or in.

When for any reason the blades have to be removed to make way for the insertion of others, the pins D, which are small screws, are taken out, and the blades can then be drawn out through the end openings, $b$. These openings are covered with a metal piece, E, pivoted to the sides of the case above, as shown at $i$. These pieces act as covers for the openings $b$ when the blades are drawn in, and can be pushed up out of the way when the blades are projected, and then act as clamps, resting upon top of the blades, and held firmly in position by the ends of the lid B when said lid is closed. They thus also keep the blades from slipping out when they are so held by the lid. The blades are thus held down firmly, and cannot, by any motion, injure the hand, nor can they slip in again, because of their pins D being in the sockets $d$ of the cover.

In this knife there are no pivots in the blades, which in ordinary knives become loose and render the blades useless. They are always firm and rigid. No dirt can get in the knife, and the blades can always be pushed out ready for use, and when worn out or broken can be removed and others inserted.

When the knife is to be used I open the lid B, and with my thumb-nail push on the pin or lug D, and push the blade out through the end. The groove $e$ in its stem or base slides upon the flange or rib $c$, keeping the edge of the blade from touching the bottom of the case, and preventing it from falling out of position. The point of this blade will raise the piece E, and when it is fully out I close down the lid, the sockets $d$ in which fit the lugs D, its ends keeping the clamps E in place, thus securing the blades. When I draw the blade in, the clamp E will fall back to fit the opening $b$, and the blade is held in the case by the end piece, E, which cannot be raised while the cover remains closed.

Having thus described my invention, what I claim as new, and desire to secure by Letters Patent, is—

1. A pocket-knife consisting of the handle or case A, having end openings, b, and end pieces, E, and provided with a hinged lid, B, having sockets d, and the blades C, with their lugs or pins D, when arranged and used substantially as and for the purpose herein described.

2. In combination with a case, A, having end openings, b, and ribs c, and divided into spaces, said case being fitted with a hinged cover, B, the blades C, having a grooved stem or base, e, and the swinging end pieces or clamps, E, when arranged substantially as herein described.

3. In a knife having a casing, A, provided with end openings, b, and a hinged lid, B, having sockets d, the blades C, provided with lugs or pins or screws D, substantially as and for the purpose herein described.

In witness whereof I have hereunto set my hand.

ALBERT KAYSER.

Witnesses:
WM. F. BOOTH,
S. H. NOURSE.